US009753313B2

(12) United States Patent
Liu

(10) Patent No.: US 9,753,313 B2
(45) Date of Patent: Sep. 5, 2017

(54) ELECTRONIC DEVICE AND METHOD FOR DISPLAYING ON TRANSPARENT SCREEN

(71) Applicants: Beijing Lenovo Software Ltd., Beijing (CN); Lenovo (Beijing) Limited, Beijing (CN)

(72) Inventor: Junfeng Liu, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 537 days.

(21) Appl. No.: 13/834,769

(22) Filed: Mar. 15, 2013

(65) Prior Publication Data

US 2013/0335656 A1 Dec. 19, 2013

(30) Foreign Application Priority Data

Mar. 26, 2012 (CN) .......................... 2012 1 0082748

(51) Int. Cl.
*G02F 1/1335* (2006.01)
*G02F 1/1334* (2006.01)
*G02F 1/133* (2006.01)
*G02F 1/1347* (2006.01)
*G02F 1/1333* (2006.01)

(52) U.S. Cl.
CPC ........ *G02F 1/13306* (2013.01); *G02F 1/1334* (2013.01); *G02F 1/13476* (2013.01); *G02F 1/133615* (2013.01); *G02F 2001/133342* (2013.01); *G02F 2201/44* (2013.01)

(58) Field of Classification Search
CPC ............. G02F 1/1334; G02F 1/133615; G02F 1/1323; G02F 1/13476; G02F 1/133553; G02F 1/134363; G02F 1/13342; G02F 1/1336; G02F 1/13471; G02F 1/1362; G02F 1/153; G02F 1/1333; G02F 1/133362; G02F 1/133365; G02F 2001/13347; G02F 2001/13775; G02F 2001/13756;
(Continued)

(56) References Cited

U.S. PATENT DOCUMENTS 6,144,359 A * 11/2000 Grave .................... B60Q 3/044
345/102
6,829,015 B2 12/2004 Kwon
(Continued)

FOREIGN PATENT DOCUMENTS

CN 1366438 A 8/2002
CN 101390013 A 3/2009

OTHER PUBLICATIONS

First Office Action for Chinese Patent Application No. 201210082748.1, dated Dec. 1, 2015.

*Primary Examiner* — Thoi Duong
(74) *Attorney, Agent, or Firm* — Westman, Champlin & Koehler, P.A.

(57) ABSTRACT

Electronic devices and methods for displaying on a transparent screen are disclosed. The electronic device includes: a display unit having a first side and a second side and configured to display an image; a first adjusting unit provided on the first or second side of the display unit and is configured to switch from a first state to a second state. The first adjusting unit has a first transmittance in the first state and a second transmittance in the second state. The first transmittance is different from the second transmittance.

18 Claims, 4 Drawing Sheets

(58) Field of Classification Search
CPC ... G02F 2203/03; C09K 19/544; C09K 19/38; G09G 3/3406; G09G 3/36
USPC ......... 349/86, 88, 61, 183, 201, 187, 56, 89, 349/193, 197, 68, 96
See application file for complete search history.

(56) References Cited

U.S. PATENT DOCUMENTS 7,854,513 B2    12/2010   Quach
8,104,895 B2     1/2012   Quach
8,599,335 B2 * 12/2013   Gao .................. G02F 1/133528
                                                                   349/96

* cited by examiner

ELECTRONIC DEVICE AND METHOD FOR DISPLAYING ON TRANSPARENT SCREEN

CROSS-REFERENCE TO RELATED APPLICATION

This Application claims priority to Chinese Application No. 201210082748.1, filed on Mar. 26, 2012, in Chinese, the contents of which are hereby incorporated by reference in their entirety.

TECHNICAL FIELD

Embodiments of the present invention relates to display technology, and more particularly, to electronic devices and methods for displaying on a transparent screen.

BACKGROUND

With development of electronic industry and the increasing prevalence of electronic devices, a transparent screen has been invented. An advantage of the transparent screen is that a user can view not only contents displayed on the screen, but also areas behind the transparent screen by seeing through the transparent screen. In addition, a user can view the content on the display from either of the sides of the transparent screen.

The transparent screen can be applied in electronic devices such as cell phones, computers and TV sets, such that the user can see areas behind the transparent screen while viewing the contents displayed on the transparent screen.

The inventors found at least the following problems with the conventional transparent screens. Since people can view the contents displayed on the transparent screen from various angles, information leakage is possible when a private file of some user is displayed on the transparent screen. Further, when the transparent screen is placed on a support having an intricate appearance on its surface, the display effect of the screen will be affected. Since the transparency of the transparent screen is not adjustable, the flexibility of transparent screen display is degraded, and inconvenience may caused to the user.

SUMMARY

Embodiments of the present invention provide an electronic device and a method for displaying on a transparent screen, capable of solving at least one of the above problems.

According to an embodiment of the present invention, an electronic device is provided. The electronic device includes: a display unit having a first side and a second side and configured to display an image, wherein the first side and the second side are opposite, and the display unit has a transmittance higher than a predetermined transmittance in a first direction and a second direction, the first direction being a direction from the first side to the second side and the second direction being a direction from the second side to the first side; and a first adjusting unit provided on the first or second side of the display unit and configured to switch from a first state to a second state, wherein the first adjusting unit has a first transmittance in the first state and a second transmittance in the second state, the first transmittance being different from the second transmittance.

According to another embodiment of the present invention, a method for displaying on a transparent screen is provided. The method is applied in an electronic device. The method includes: obtaining first switch command information in the first state; and switching the first adjusting unit from the first state to the second state in accordance with the first switch command information.

According to another embodiment of the present invention, an apparatus capable of displaying on a transparent screen is provided. The apparatus includes: a receiving unit configured to obtain first switch command information in a first state; and a switching unit configured to switch a first adjusting unit from the first state to a second state in accordance with the first switch command information.

With the electronic devices and the methods for displaying on a transparent screen according to the embodiments of the present invention, the first adjusting unit is switched from the first state to the second state in accordance with the received first switch command information, such that the transmittance and thus the transparency of the first adjusting unit is changed. Accordingly, the display effect of the electronic device is changed. In this way, the electronic device can perform a display operation in a more flexible and convenient manner.

BRIEF DESCRIPTION OF THE DRAWINGS

In order to clearly explain the solutions according to the embodiments of the present invention, figures used in the following description of the embodiments will be described briefly. Obviously, the following figures are only some embodiments of the present invention. Other figures can be obtained by those skilled in the art from these figures without any inventive efforts.

DETAILED DESCRIPTION OF THE EMBODIMENTS

The solutions according to the embodiments of the present invention will be described clearly and completely in the following with reference to the figures. Obviously, the embodiments described are only some, not all, embodiments of the present invention. Other embodiments can be readily made by those skilled in the art based on the embodiments described in the present disclosure. All such embodiments are encompassed by the scope of the present invention.

Figure 1:
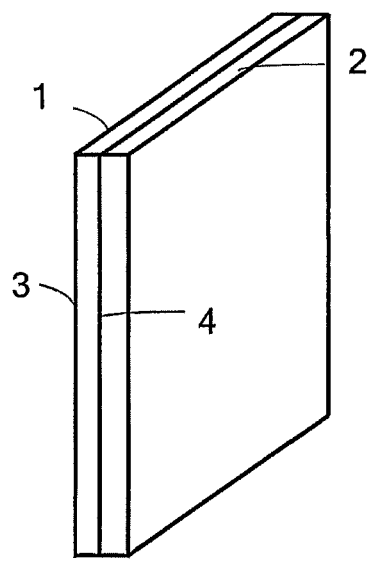
FIG. 1 is a schematic block diagram of an electronic device including a first adjusting unit according to an embodiment of the present invention.

This embodiment provides an electronic device, which may be incorporated with a display module for displaying contents. As shown in FIG. 1, the electronic device includes a display unit 1 and a first adjusting unit 2.

The display unit 1 has a first side 3 and a second side 4 and is configured to display an image. The first side 3 and the second side 4 are opposite sides of the display unit 1. The display unit 1 has a transmittance higher than a predetermined transmittance in a first direction and a second direction. Here, the first direction is a direction from the first side 3 to the second side 4 and the second direction is a direction from the second side 4 to the first side 3.

The first adjusting unit 2 is provided on the first side 3 or the second side 4 of the display unit 1 and is configured to switch from a first state to a second state. The first adjusting unit 2 has a first transmittance in the first state and a second transmittance in the second state. Here, the first transmittance is different from the second transmittance.

With the above solution, the first adjusting unit 2 switches from the first state to the second state in accordance with the received first switch command information, such that the transmittance and thus the transparency of the first adjusting unit 2 is changed. Accordingly, the display effect of the electronic device is changed. In this way, the electronic device can perform its display operation in a more flexible and convenient manner.

Figure 2:
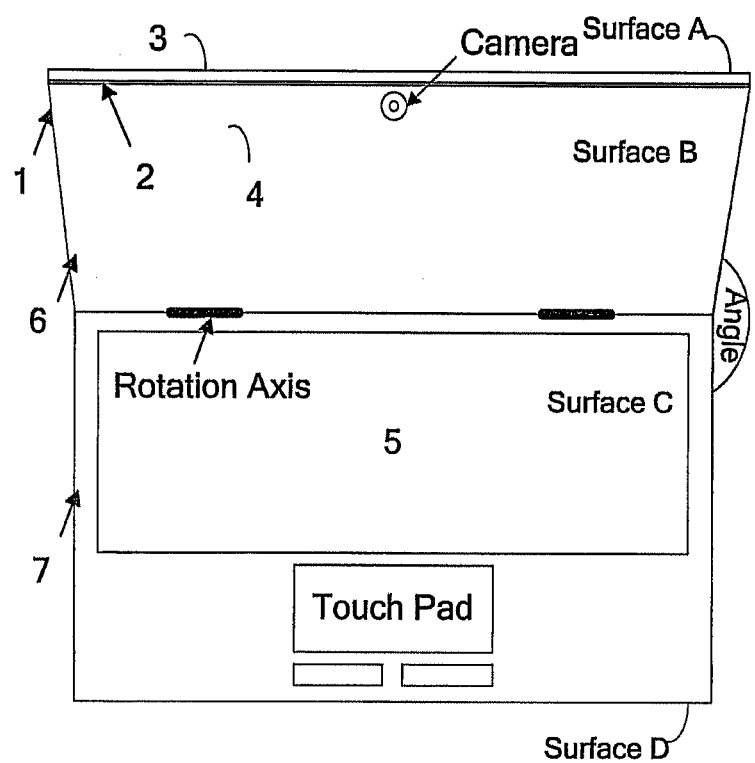
FIG. 2 is a schematic block diagram of a notebook computer including the electronic device shown in FIG. 1.

As a modification to the above embodiment, another electronic device is provided. The electronic device includes a display module. As shown in FIG. 2, the electronic device includes a display unit 1 and a first adjusting unit 2.

In the electronic device according to this embodiment, only one of the first side 3 and the second side 4 has an adjustable transmittance.

In particular, the display unit 1 has a first side 3 and a second side 4 and is configured to display an image. The first side 3 and the second side 4 are opposite sides of the display unit 1. The display unit 1 has a transmittance higher than a predetermined transmittance in a first direction and a second direction. Here, the first direction is a direction from the first side 3 to the second side 4 and the second direction is a direction from the second side 4 to the first side 3.

The first adjusting unit 2 is provided on the first side 3 or the second side 4 of the display unit 1 and is configured to switch from a first state to a second state. The first adjusting unit 2 has a first transmittance in the first state and a second transmittance in the second state. Here, the first transmittance is different from the second transmittance.

Further, the first adjusting unit 2 adjusts its transmittance in accordance with the received first switch command information.

Alternatively, the first adjusting unit 2 may adjust its transmittance by adjusting arrangement of liquid crystal cells.

Alternatively, the first adjusting unit 2 includes a controller array and adjusts its transmittance by adjusting the on/off state of each sub-controller in the controller array.

In an implementation of this embodiment, the first adjusting unit 2 can be a liquid crystal panel or a film such as a Polymer Dispersed Liquid Crystal (PDLC) film.

Figure 3:
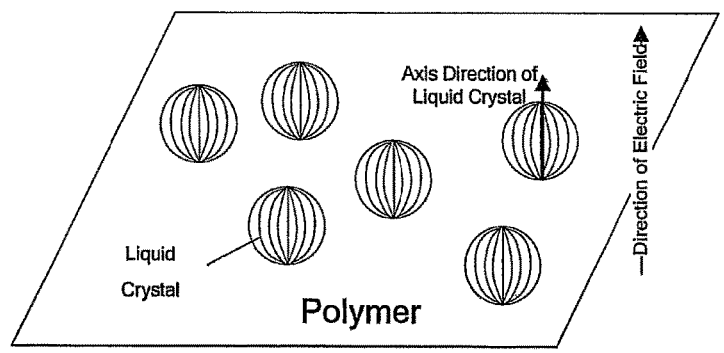
FIG. 3 is a schematic block diagram of a film on which a voltage is applied according to an embodiment of the present invention.
Figure 4:
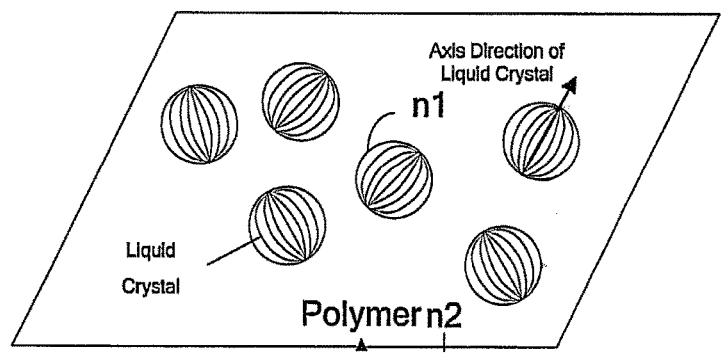
FIG. 4 is a schematic block diagram of a film on which no voltage is applied according to an embodiment of the present invention.

In particular, a PDLC film includes liquid crystal cells and polymers. As shown in FIG. 3, when a voltage is applied on the PDLC film, the optical axes of liquid crystal cells are perpendicular to the surface of the PDLC film, i.e., along the direction of the electric field. In this case, the refraction index of the liquid crystal cells substantially matches the refraction index of the polymers, without an interface between them. A substantially uniform medium is thus formed and an incident light will not be scattered. In this case, the PDLC film is transparent. On the other hand, as shown in FIG. 4, when no external voltage is applied on the PDLC film, there is no regular electrical field across the PDLC film. The optical axes of the liquid crystal cells are randomly oriented in a disordered state. The refraction index n1 of the liquid crystal cells does not match the refraction index n2 of the polymer, such that an incident light will be scattered. In this case, the PDLC film is semi-transparent or opaque.

If the first adjusting unit 2 is a PDLC film, its transparency can be adjusted linearly. The transmittance of the first adjusting unit 2 can be any value between 0% and 100%.

Alternatively, the first adjusting unit 2 includes a controller array and adjusts its transmittance by adjusting the on/off state of each sub-controller in the controller array.

In an implementation of this embodiment, the first adjusting unit 2 can include a shutter array. When each shutter in the shutter array is opened, light can transmit through the first adjusting unit 2. At this time, the first adjusting unit 2 will have its maximum transmittance. When each shutter in the shutter array is closed, no light can transmit through the first adjusting unit 2. At this time, the first adjusting unit 2 will have its minimum transmittance.

If the first adjusting unit 2 includes a shutter array, its transmittance can be any value between the above maximum transmittance and the above minimum transmittance. That is, the transparency of the first adjusting unit 2 can be adjusted discretely.

The present invention is not limited to any specific shutter array, which is well known in the art and the description thereof will be omitted here.

The present invention is not limited to any specific approach for adjusting the transmittance of the first adjusting unit 2, while it can be configured depending on practical requirements and the description thereof will be omitted here.

Further, the electronic device has at least one of the following operation modes: a first operation mode in which the first transmittance is higher than the predetermined transmittance; and a second operation mode in which the second transmittance is lower than the predetermined transmittance.

In an implementation of this embodiment, as shown in FIG. 2, when the first adjusting unit 2 is located on the second side 4 of the display unit 1 and is in the first operation mode in which the first transmittance is higher than the predetermined transmittance, the user may view the contents displayed on the display unit 1 from the second side 4. When the first adjusting unit 2 is in the second operation mode in which the first transmittance is lower than the predetermined transmittance, the user cannot view, or at least cannot view clearly, the contents displayed on the display unit 1 from the second side 4. The situation in which the first adjusting unit 2 is located on the first side 3 of the display unit 1 is similar and the description thereof will be omitted here.

The present invention is not limited to any specific value of the predetermined transmittance, while it can be configured depending on practical requirements and the description thereof will be omitted here.

The electronic device further includes a first detecting unit and a first processing unit.

In particular, the first detecting unit detects whether the electronic device satisfies a first predetermined condition.

The first processing unit generates the first switch command information when the first predetermined condition is satisfied, such that the electronic device is switched from the first operation mode to the second operation mode or from the second operation mode to the first operation mode, in accordance with the first switch command information.

Alternatively, the first detecting unit can be an input unit configured to detect whether there is predetermined input information.

In an implementation of this embodiment, the user may input information via the input unit to adjust the transmittance of the first adjusting unit 2. For example, when the input unit is a keyboard 5, the user may adjust the transmittance of the first adjusting unit by inputting text information or numerical information via the keyboard.

The present invention is not limited to any type of the input unit, while it can be configured as for example a keyboard or a handwriting pad depending on practical requirements and the description thereof will be omitted here.

Alternatively, the first detecting unit can be a luminance acquiring unit configured to detect whether a spatial ambient luminance satisfies a predetermined luminance condition.

In an implementation of this embodiment, the luminance acquiring unit periodically acquires information on the ambient luminance. When the acquired luminance information has a value higher than a predetermined luminance value, the first adjusting unit is triggered to decrease the transmittance. When the acquired luminance information has a value lower than the predetermined luminance value, the first adjusting unit is triggered to increase the transmittance.

The present invention is not limited to any specific type of the luminance acquiring unit, any specific approach for acquiring luminance information by the luminance acquiring unit or any specific magnitude of the predetermined luminance value, while they can be configured depending on practical requirements and the description thereof will be omitted here.

Alternatively, the first detecting unit can be a spatial location sensor configured to detect whether a spatial location satisfies a predetermined spatial location condition.

In an implementation of this embodiment, when the first adjusting unit 2 is vertically placed, the transmittance of the first adjusting unit 2 is set to its maximum value, i.e., it is completely transparent. In this case, the user may view the screen while watching his/her way.

Alternatively, when the first adjusting unit 2 is vertically placed, the transmittance of the first adjusting unit 2 is set to its minimum value to avoid interference. In this case, the user will not be interfered by backgrounds when viewing the contents displayed on the first side 3 or the second side 4 of the display unit 1.

When the first adjusting unit 2 is horizontally placed, its transmittance is set to its maximum value if it faces upwards, i.e., it is completely transparent. In this case, the user may view the contents displayed on the display unit 1.

When the first adjusting unit 2 is horizontally placed, its transmittance is set to its maximum value if it faces downwards, i.e., it is opaque. In this case, the user may view the contents displayed on the display unit 1 without being interfered by background images.

When the first adjusting unit 2 is moving in space, its transmittance is set to its maximum value, i.e., it is completely transparent.

When the first adjusting unit 2 is static in space, its transmittance is set to its minimum value to avoid interference.

The present invention is not limited to any specific state of the first adjusting unit 2, while it can be configured depending on practical requirements and the description thereof will be omitted here.

Alternatively, the first detecting unit can be an image capturing unit provided on a side toward the first adjusting unit 1 and configured to detect whether a predetermined image condition is satisfied.

In an implementation of the this embodiment, the first detecting unit detects whether there is a user on the side on which the first adjusting unit 2 is provided. If so, it automatically switches to be transparent such that the user can view the contents displayed on the display unit 1. Alternatively, it detects whether there is a user. If so, it automatically switches to be opaque such that the user cannot view the contents displayed on the display unit, thereby ensuring security for the displayed contents.

The present invention is not limited to any specific approach for capturing the image or any specific type of the image capturing unit, while they can be configured depending on practical requirements (e.g., the image capturing unit can be a camera) and the description thereof will be omitted here.

Alternatively, the first detecting unit can be a proximity detecting unit configured to detect whether a state of an object within a predetermined distance from the first adjusting unit satisfies a predetermined reference object condition.

In an implementation of the this embodiment, the first detecting unit detects the number of blinks of a user. When the number of blinks is larger than a predetermined value, the user may be in a fatigued state. In this case, the first adjusting unit 2 increases its transmittance such that the user can view the contents displayed on the display unit 1 more clearly. When the number of blinks is smaller than a predetermined value, the first adjusting unit 2 can decrease its transmittance.

In another implementation of the embodiment, the first detecting unit detects the distance between the user and the first adjusting unit 2. When the user is detected and the detected distance is larger than a predetermined value, the first adjusting unit 2 increases its transmittance such that the user can view the contents displayed on the display unit 1 more clearly. When the user is detected and the detected distance is smaller than a predetermined value, the first adjusting unit 2 can decrease its transmittance.

The present invention is not limited to any specific state of the object, while it can be configured depending on practical requirements and the description thereof will be omitted here.

Figure 5:
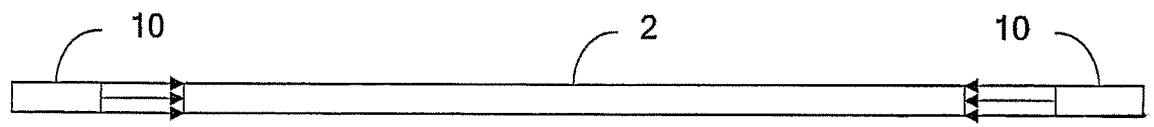
FIG. 5 is a schematic block diagram of a film to which a light source is applied to change its color.

Further, in order to the achieve diversity in displaying a image on the display unit, the electronic device further includes a light source 10 as shown in FIG. 5.

The first adjusting unit 2, e.g., a film which is light transmittable itself, can change the color of the light transmitted through the first adjusting unit 2 by using the light source 10 provided on a side of the first adjusting unit 2. The color presented by the light source is the color of the light transmitting through the first adjusting unit 2.

In an implementation of the this embodiment, the light source 10 includes three sub light sources, i.e., a red sub light source, a green sub light source and a blue sub light source. The light intensities of the three sub light sources can be changed by adjusting their voltages, such that the color of the light source can be changed.

Alternatively, as shown in FIG. 2, when the electronic device is a notebook computer, the first detecting unit 2 detects whether information on location relation of the first body 6 and the second body 7 satisfies the first predetermined condition. When the first predetermined condition is satisfied, the first processing unit generates the first switch command information based on the location relation information and is switched from the first operation mode to the second operation mode or from the second operation mode to the first operation mode, in accordance with the first switch command information.

FIG. 2 shows a notebook computer. The first adjusting unit 2 is provided on its surface B. Here, surface A, surface B, surface C and surface D refer to four surfaces of the notebook computer, respectively. Surface A is the first side 3 and Surface B is the second side 4.

In an implementation of the this embodiment, when surface B and surface C form an angle between 0° and 90° or between 180° and 270°, if the transparent screen is in its operating state, it is set to the second operation mode such that the user can view the displayed contents from surface A. When surface B and surface C form an angle between 90° and 180° or between 270° and 360°, the transparent screen is set to the first operation mode (i.e., the first adjusting unit 2 is set to be opaque) such that the user can view the displayed contents from surface B.

When surface B and surface C form an angle of 0°, the transparent screen is set to the second operation mode (i.e., the first adjusting unit 2 is set to be opaque) such that, when the user is viewing the displayed contents from surface A, he/she will not see the characters on the keyboard through the transparent screen and the displayed contents are thus clearer to the user. When surface B and surface C form an angle of 90°, the transparent screen is set to the first operation mode such that the user can only view the displayed contents from surface B.

With the above solution, the first adjusting unit 2 switches from the first state to the second state in accordance with the received first switch command information, such that the transmittance and thus the transparency of the first adjusting unit 2 is changed. Accordingly, the display effect of the electronic device is changed. In this way, the electronic device will perform display operations in a more flexible and convenient manner.

Figure 6:
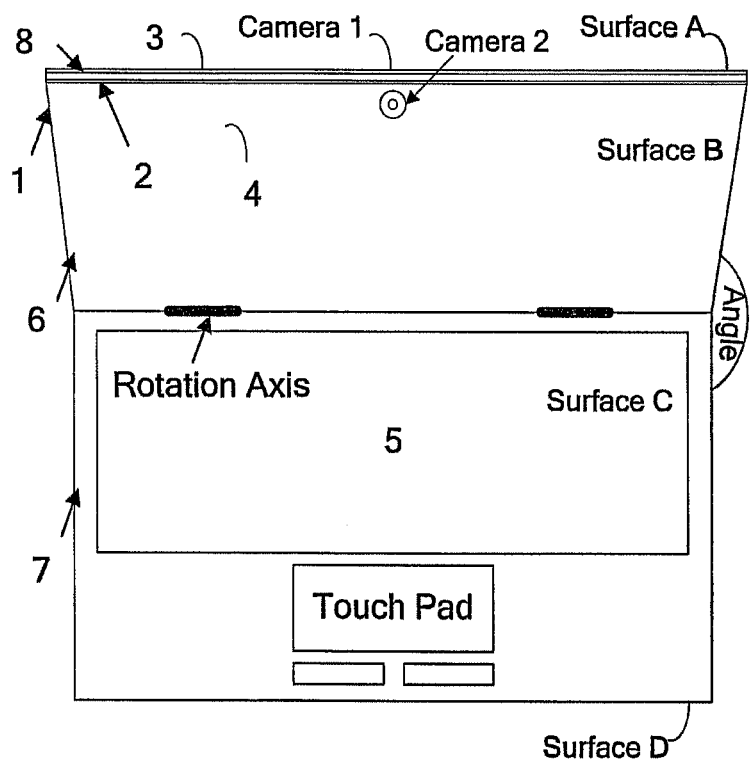
FIG. 6 is a schematic block diagram of an electronic device including a first adjusting unit and a second adjusting unit according to an embodiment of the present invention.

In an improvement to the above embodiment, an embodiment provides another electronic device. The display unit of this device includes two adjusting units. As shown in FIG. 6, the electronic device includes: a display unit 1, a first adjusting unit 2 and a second adjusting unit 8. FIG. 6 shows a notebook computer, with the second adjusting unit 8 provided on its surface A and the first adjusting unit 2 provided on its surface B. Here, surface A, surface B, surface C and surface D refer to four surface s of the notebook computer, respectively.

The display unit 1 has a first side 3 and a second side 4 and is configured to display an image. The first side 3 and the second side 4 are opposite sides of the display unit 1. The display unit 1 has a transmittance higher than a predetermined transmittance in a first direction and a second direction. Here, the first direction is a direction from the first side 3 to the second side 4 and the second direction is a direction from the second side 4 to the first side 3.

The first adjusting unit 2 is provided on the first side 3 or the second side 4 of the display unit 1 and is configured to switch from a first state to a second state. The first adjusting unit 2 has a first transmittance in the first state and a second transmittance in the second state. Here, the first transmittance is different from the second transmittance.

In order to allow both of the first side 3 and the second side 4 to have adjustable transmittance, the electronic device further includes a second adjusting unit 8.

The second adjusting unit 8 is provided a side of the display unit 1 which is opposite to the side on which the first adjusting unit 2 is provided and configured to switch from a third state to a fourth state. The second adjusting unit 8 has a third transmittance in the third state and a fourth transmittance in the fourth state. The third transmittance is different from the fourth transmittance.

The present invention is not limited to any specific type or operation principle of the second adjusting unit 8, and they are similar to those of the first adjusting unit 2.

Further, the electronic device has at least one of the following operation modes: a third operation mode in which the first adjusting unit 2 has a fifth transmittance and the second adjusting unit 8 has a sixth transmittance, the fifth transmittance and the sixth transmittance being higher than the predetermined transmittance; a fourth operation mode in which the first adjusting unit 2 has a fifth transmittance and the second adjusting unit 8 has a seventh transmittance, the fifth transmittance being higher than the predetermined transmittance and the seventh transmittance being lower than the predetermined transmittance; and a fifth operation mode in which the first adjusting unit 2 has an eighth transmittance and the second adjusting unit 8 has a sixth transmittance, the eighth transmittance being lower than the predetermined transmittance and the sixth transmittance being higher than the predetermined transmittance.

In an implementation of this embodiment, in the third operation mode, the user can view the contents displayed on the display unit 2 from each of the first side 3 and the second side 4. In the fourth operation mode, the user can only view the displayed contents from the side on which the first adjusting unit 2 is provided. In the fifth operation mode, the user can only view the displayed contents from the side on which the second adjusting unit 8 is provided.

Further, the electronic device 1 includes: a second detecting unit configured to detect whether the electronic device satisfies a second predetermined condition; and a second processing unit configured to generate second switch command information when the second predetermined condition is satisfied, such that the electronic device is switched from one of the third, fourth and fifth operation modes to another one of the third, fourth and fifth operation modes in accordance with the second switch command information.

The operation principle of the second detecting unit is the same as that of the first detecting unit. Similarly, the second detecting unit can be an input unit, a luminance acquiring unit, a spatial location sensor, an image capturing unit or a proximity detecting unit. The description thereof will be omitted here.

As an embodiment of the present invention, the second detecting unit can be a camera. As shown in FIG. 6, a camera 1 and a camera 2 are provided on the notebook computer for acquiring state information of an object within a predetermined distance from the notebook computer.

In an embodiment of the present invention, as shown in FIG. 6, the first adjusting unit 2 is located on surface B and the second adjusting unit is located on surface A. When the user is not on the side of surface A, the camera 1 acquires the object state information indicating that there is no object on surface A. In this case, the electronic device is set to the fourth operation mode. When the user is not on the side of surface B, the camera 1 acquires the object state information indicating that there is no object on surface B. In this case, the electronic device is set to the fifth operation mode. When there are users on the sides of both surface A and surface B, the electronic device is set to the third operation mode.

Alternatively, when the user is not on the side of surface A and/or surface B, the transmittance of the first adjusting unit 2 and/or the second adjusting unit 8 corresponding to the no-user side can be adjusted depending on practical requirements, e.g., to be semi-transparent. The present invention is not limited in this aspect.

Alternatively, the screen of the notebook computer can be a touch screen. In this case, users on the sides of surface A and surface B of the notebook computer can perform operations by touching the screen, e.g., playing a gobang or go game.

Alternatively, as shown in FIG. 6, when the electronic device is a notebook computer, the second detecting unit 8 detects whether information on location relation of the third body and the fourth body satisfies the second predetermined condition. When the second predetermined condition is satisfied, the second processing unit generates the second switch command information based on the location relation information and is switched from one of the third, fourth and fifth operation modes to another one of the third, fourth and fifth operation modes in accordance with the second switch command information.

In an embodiment of this embodiment, as shown in FIG. 6, the first adjusting unit 2 is located on surface B and the second adjusting unit 8 is located on surface A. When surface B and surface C form an angle between 0° and 90° or between 180° and 270°, if the transparent screen is in its operating state, the electronic device is set to the fifth operation mode. When surface B and surface C form an angle between 90° and 180° or between 270° and 360°, the electronic device is set to the fourth operation mode (i.e., the first adjusting unit 2 is set to be opaque) such that the user can view the displayed contents from surface B.

When surface B and surface C form an angle of 0°, the electronic device is set to the fifth operation mode, such that, when the user is viewing the displayed contents from Plane A, he/she will not see the characters on the keyboard through the transparent screen and the displayed contents are thus clearer to the user. When surface B and surface C form an angle of 90°, the transparent screen is set to the fourth operation mode such that the displayed contents can only be viewed from surface B and cannot be viewed by other users.

With the above solutions, the operation mode of the electronic device can be adjusted by adjusting the transmittances of the first adjusting unit 2 and the second adjusting unit 8. In this way, display of the electronic device display is more flexible and more user-convenient.

According to an embodiment, a method for displaying on a transparent screen is provided. The method can be applied in the electronic device according to the above embodiment. The electronic device includes: a display unit having a first side and a second side and configured to display an image, wherein the first side and the second side are opposite and the display unit has a transmittance higher than a predetermined transmittance in a first direction and a second direction, the first direction being a direction from the first side to the second side and the second direction being a direction from the second side to the first side; and a first adjusting unit provided on the first or second side of the display unit and configured to switch from a first state to a second state, wherein the first adjusting unit has a first transmittance in the first state and a second transmittance in the second state, the first transmittance being different from the second transmittance.

Figure 7:
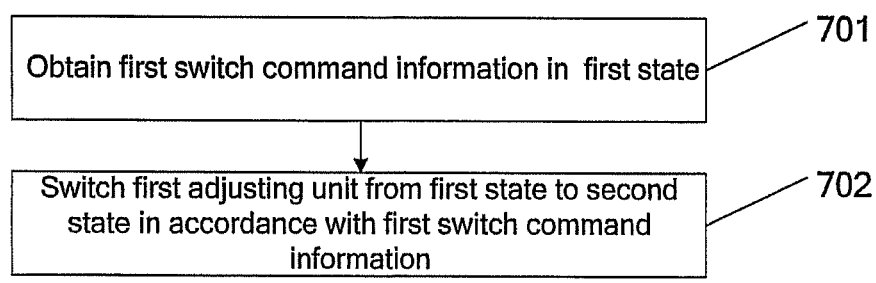
FIG. 7 is a flowchart of a method for displaying on a transparent screen according to an embodiment of the present invention.

As shown in FIG. 7, the method includes the following steps.

At step 701, first switch command information is obtained in the first state.

In order to adjust the transmittance of the first adjusting unit and thus the transparency of the electronic device, the electronic device obtains the first switch command information in the first state.

Alternatively, the step of obtaining first switch command information in the first state can include: detecting whether the electronic device satisfies a first predetermined condition; and generating the first switch command information when the first predetermined condition is satisfied, such that the electronic device is switched from the first operation mode to the second operation mode or from the second operation mode to the first operation mode, in accordance with the first switch command information.

Alternatively, the first switch command information instructs the first adjusting unit to adjust its transmittance by adjusting arrangement of liquid crystal cells.

Alternatively, the first adjusting unit includes a controller array and the first switch command information instructs the first adjusting unit to adjust its transmittance by adjusting on/off state of each sub-controller in the controller array.

Alternatively, the electronic device has at least one of the following operation modes: a first operation mode in which the first transmittance is higher than the predetermined transmittance; and a second operation mode in which the first transmittance is lower than the predetermined transmittance.

At step 702, the first adjusting unit switches from the first state to the second state in accordance with the first switch command information.

With the above solutions, the electronic device switches the first adjusting unit from the first state to the second state in accordance with the obtained first switch command information. Accordingly, the display effect of the electronic device is changed. In this way, display of the electronic device display is more flexible and more user-convenient.

In an improvement to the above embodiment, another method for displaying on a transparent screen is provided. The method can be applied in the electronic device according to the above embodiment. The electronic device includes: a display unit having a first side and a second side and configured to display an image, wherein the first side and the second side are opposite, and the display unit has a transmittance higher than a predetermined transmittance in a first direction and a second direction, the first direction being a direction from the first side to the second side and the second direction being a direction from the second side to the first side; a first adjusting unit provided on the first or second side of the display unit and configured to switch from a first state to a second state, wherein the first adjusting unit has a first transmittance in the first state and a second transmittance in the second state, the first transmittance being different from the second transmittance; and a second adjusting unit provided a side of the display unit which is opposite to the side on which the first adjusting unit is provided and configured to switch from a third state to a fourth state, wherein the second adjusting unit has a third transmittance in the third state and a fourth transmittance in the fourth state, the third transmittance being different from the fourth transmittance.

Figure 8:
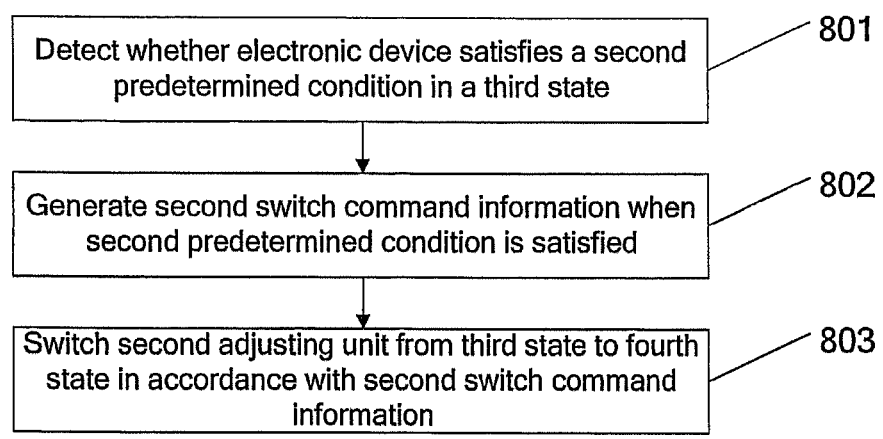
FIG. 8 is a flowchart of another method for displaying on a transparent screen according to an embodiment of the present invention.

As shown in FIG. 8, the method for transparent screen display includes the following steps.

At step 801, it is detected whether the electronic device satisfies a second predetermined condition in the third state.

In order to adjust the transmittance of the first and second adjusting units and thus the transparency of the electronic device, the electronic device obtains the first switch command information in the first state.

Alternatively, the step of detecting whether the electronic device satisfies a first predetermined condition includes at least one of the following.

The electronic device can detect whether there is predetermined input information using an input unit.

The electronic device can detect whether a spatial ambient luminance satisfies a predetermined luminance condition using a luminance acquiring unit.

The electronic device can detect whether a spatial location satisfies a predetermined spatial location condition using a spatial location sensor.

The electronic device can detect whether a predetermined image condition is satisfied using an image capturing unit.

The electronic device can detect whether a state of an object within a predetermined distance from the first adjusting unit satisfies a predetermined reference object condition using a proximity detecting unit.

The present invention is not limited to any specific type of input unit, luminance acquiring unit, spatial location sensor, image capturing unit or proximity detecting unit, while they can be configured depending on practical requirements and the description thereof will be omitted here.

At step 802, second switch command information is generated when the second predetermined condition is satisfied.

In particular, the second switch command information is generated when the second predetermined condition is satisfied, such that the electronic device is switched from one of the third, fourth and fifth operation modes to another one of the third, fourth and fifth operation modes in accordance with the second switch command information.

The electronic device has at least one of the following operation modes: a third operation mode in which the first adjusting unit has a fifth transmittance and the second adjusting unit has a sixth transmittance, the fifth transmittance and the sixth transmittance being higher than the predetermined transmittance; a fourth operation mode in which the first adjusting unit has a fifth transmittance and the second adjusting unit has a seventh transmittance, the fifth transmittance being higher than the predetermined transmittance and the seventh transmittance being lower than the predetermined transmittance; and a fifth operation mode in which the first adjusting unit has an eighth transmittance and the second adjusting unit has a sixth transmittance, the eighth transmittance being lower than the predetermined transmittance and the sixth transmittance being higher than the predetermined transmittance.

At step 803, the second adjusting unit switches from the third state to the fourth state in accordance with the second switch command information.

With the above solutions, the transmittances of the first and second adjusting units are adjusted in accordance with the first or second switch command information. Accordingly, the operation mode of the electronic device is adjusted. In this way, display of the electronic device is more flexible and more convenient for the user.

Figure 9:
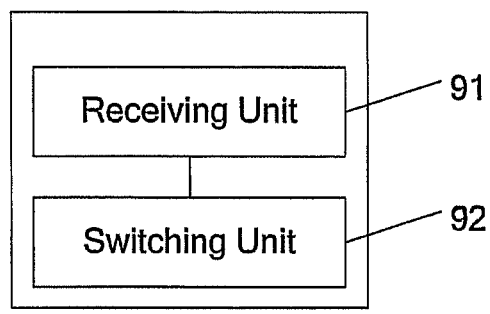
FIG. 9 is a schematic block diagram of an apparatus capable of displaying on a transparent screen according to an embodiment of the present invention.

According to an embodiment, an apparatus for displaying on a transparent screen is provided. As shown in FIG. 9, the apparatus includes a receiving unit 91 and a switching unit 92.

The receiving unit 91 obtains first switch command information in a first state.

The switching unit 92 switches a first adjusting unit from the first state to a second state in accordance with the first switch command information.

With the above solutions, the transmittance of the first adjusting unit is adjusted by the switching unit 92 in accordance with the first switch command information received by the receiving unit 91. Accordingly, the operation mode of the electronic device is adjusted. In this way, display of the electronic device is more flexible and more convenient for the user.

From the above description of the embodiments, it can be appreciated by those skilled in the art that the present invention can be implemented in software in combination with appropriate hardware or in hardware only, with the former being preferred in most cases. That is, the solution of the present invention, essentially, or a part thereof which makes a contribution over the prior art, can be embodied in a form of software product. This computer software product can be stored on a readable storage medium, such as a floppy disk, a hard disk or a optical disc and include instructions enabling a computer (such as a personal computer, a server or a network element) to perform the methods according to the various embodiments of the present invention.

The present invention has been described with reference to the above embodiments. However, the scope of the present invention is not limited to the above embodiments. Modifications and alternatives can be made by those skilled in the art without departing from the scope of the present invention. These modifications and alternatives are to be encompassed by the scope of the present invention which is defined by the claims as attached.

What is claimed is:

1. An electronic device, comprising:
a display unit having a first side and a second side and configured to display an image, wherein the first side and the second side are opposite, and the display unit has a transmittance higher than a predetermined transmittance in a first direction and a second direction, the first direction being a direction from the first side to the second side, and the second direction being a direction from the second side to the first side;
a first adjusting unit provided on any one of the first and second side of the display unit and configured to switch from a first state to a second state, wherein the first adjusting unit has a first transmittance in the first state and a second transmittance in the second state, the first transmittance being different from the second transmittance; and
a second adjusting unit provided on a side of the display unit which is opposite to the side on which the first adjusting unit is provided, and configured to switch from a third state to a fourth state, wherein the second adjusting unit has a third transmittance in the third state and a fourth transmittance in the fourth state, the third transmittance being different from the fourth transmittance.

2. The electronic device of claim 1, wherein the first adjusting unit is configured to adjust its transmittance in accordance with first received switch command information.

3. The electronic device of claim 2, wherein
the first adjusting unit is configured to adjust its transmittance by adjusting arrangement of liquid crystal cells; or
the first adjusting unit comprises a controller array, and is configured to adjust its transmittance by adjusting on/off state of each sub-controller in the controller array.

4. The electronic device of claim 3, wherein the electronic device has at least one of the following operation modes:
a first operation mode in which the first transmittance is higher than the predetermined transmittance; and
a second operation mode in which the second transmittance is lower than the predetermined transmittance.

5. The electronic device of claim 2, further comprising:
a first detecting unit configured to detect whether the electronic device satisfies a first predetermined condition; and
a first processing unit configured to generate the first switch command information when the first predetermined condition is satisfied, such that the electronic device is switched from the first operation mode to the second operation mode or from the second operation mode to the first operation mode, in accordance with the first switch command information.

6. The electronic device of claim 5, wherein
the first detecting unit is an input unit configured to detect whether there is predetermined input information;
the first detecting unit is a luminance acquiring unit configured to detect whether a spatial ambient luminance satisfies a predetermined luminance condition;
the first detecting unit is a spatial location sensor configured to detect whether a spatial location satisfies a predetermined spatial location condition;
the first detecting unit is an image capturing unit provided on a side toward the first adjusting unit and configured to detect whether a predetermined image condition is satisfied; or
the first detecting unit is a proximity detecting unit configured to detect whether a state of an object within a predetermined distance from the first adjusting unit satisfies a predetermined reference object condition.

7. The electronic device of claim 5, comprising:
a first body comprising the electronic device;
a second body connected with the first body via a rotation axis;
wherein the first detecting unit detects whether location relation information of the first body and the second body satisfies the first predetermined condition, and
when the first predetermined condition is satisfied, the first processing unit generates the first switch command information based on the location relation information and is switched from the first operation mode to the second operation mode or from the second operation mode to the first operation mode, in accordance with the first switch command information.

8. The electronic device of claim 1, wherein the electronic device has at least one of the following operation modes:
a third operation mode in which the first adjusting unit has a fifth transmittance and the second adjusting unit has a sixth transmittance, the fifth transmittance and the sixth transmittance being higher than the predetermined transmittance;
a fourth operation mode in which the first adjusting unit has a fifth transmittance and the second adjusting unit has a seventh transmittance, the fifth transmittance being higher than the predetermined transmittance, and the seventh transmittance being lower than the predetermined transmittance; and
a fifth operation mode in which the first adjusting unit has an eighth transmittance and the second adjusting unit has a sixth transmittance, the eighth transmittance being lower than the predetermined transmittance, and the sixth transmittance being higher than the predetermined transmittance.

9. The electronic device of claim 1, further comprising:
a second detecting unit configured to detect whether the electronic device satisfies a second predetermined condition; and
a second processing unit configured to generate second switch command information when the second predetermined condition is satisfied, such that the electronic device is switched from one of the third, fourth and fifth operation modes to another one of the third, fourth and fifth operation modes in accordance with the second switch command information.

10. The electronic device of claim 9, comprising:
a third body comprising the electronic device;
a fourth body connected with the third body via a rotation axis;
wherein the second detecting unit detects whether location relation information of the third body and the fourth body satisfies the second predetermined condition, and
when the second predetermined condition is satisfied, the second processing unit generates the second switch command information based on the location relation information and is switched from one of the third, fourth and fifth operation modes to another one of the third, fourth and fifth operation modes in accordance with the second switch command information.

11. The electronic device of claim 1, further comprising:
a light source provided on at least one side of the first adjusting unit and configured to emit light towards the first adjusting unit in a third direction to adjust a color of the first adjusting unit, wherein the third direction is different from both of the first direction and the second direction.

12. An apparatus which includes the electronic device of claim 1 and is capable of displaying on a transparent screen, comprising:
a receiving unit configured to obtain first switch command information in a first state; and
a switching unit configured to switch a first adjusting unit from the first state to a second state in accordance with the first switch command information.

13. A method for displaying on a transparent screen in an electronic device comprising:
a display unit having a first side and a second side and configured to display an image, wherein the first side and the second side are opposite, and the display unit has a transmittance higher than a predetermined transmittance in a first direction and a second direction, the first direction being a direction from the first side to the second side, and the second direction being a direction from the second side to the first side;
a first adjusting unit provided on any one of the first and second side of the display unit and configured to switch from a first state to a second state, wherein the first adjusting unit has a first transmittance in the first state and a second transmittance in the second state, the first transmittance being different from the second transmittance; and a second adjusting unit provided on a side of the display unit which is opposite to the side on which the first adjusting unit is provided, and configured to switch from a third state to a fourth state, wherein the second adjusting unit has a third transmittance in the third state and a fourth transmittance in the fourth state, the third transmittance being different from the fourth transmittance, the method comprising:

obtaining first switch command information in the first state; and switching the first adjusting unit from the first state to the second state in accordance with the first switch command information.

14. The method of claim 13, wherein the first switch command information instructs the first adjusting unit to adjust its transmittance by adjusting arrangement of liquid crystal cells; or the first adjusting unit comprises a controller array, and the first switch command information instructs the first adjusting unit to adjust its transmittance by adjusting on/off state of each sub-controller in the controller array, wherein the electronic device has at least one of the following operation modes:

a first operation mode in which the first transmittance is higher than the predetermined transmittance; and a second operation mode in which the first transmittance is lower than the predetermined transmittance.

15. The method of claim 14, wherein obtaining first switch command information in the first state further comprises:

detecting whether the electronic device satisfies a first predetermined condition; and generating the first switch command information when the first predetermined condition is satisfied, such that the electronic device is switched from the first operation mode to the second operation mode or from the second operation mode to the first operation mode, in accordance with the first switch command information.

16. The method of claim 15, wherein detecting whether the electronic device satisfies a first predetermined condition comprises:

detecting whether there is predetermined input information;

detecting whether a spatial ambient luminance satisfies a predetermined luminance condition;

detecting whether a spatial location satisfies a predetermined spatial location condition;

detecting whether a predetermined image condition is satisfied; or detecting whether a state of an object within a predetermined distance from the first adjusting unit satisfies a predetermined reference object condition.

17. The method of claim 13, the electronic device has at least one of the following operation modes:

a third operation mode in which the first adjusting unit has a fifth transmittance and the second adjusting unit has a sixth transmittance, the fifth transmittance and the sixth transmittance being higher than the predetermined transmittance;

a fourth operation mode in which the first adjusting unit has a fifth transmittance and the second adjusting unit has a seventh transmittance, the fifth transmittance being higher than the predetermined transmittance, and the seventh transmittance being lower than the predetermined transmittance; and a fifth operation mode in which the first adjusting unit has an eighth transmittance and the second adjusting unit has a sixth transmittance, the eighth transmittance being lower than the predetermined transmittance, and the sixth transmittance being higher than the predetermined transmittance, wherein the method further comprises:

obtaining second switch command information in the third state; and switching the second adjusting unit from the third state to the fourth state in accordance with the second switch command information.

18. The method of claim 17, wherein obtaining second switch command information in the third state further comprises:

detecting whether the electronic device satisfies a second predetermined condition; and generating second switch command information when the second predetermined condition is satisfied, such that the electronic device is switched from one of the third, fourth and fifth operation modes to another one of the third, fourth and fifth operation modes in accordance with the second switch command information.

* * * * *